(12) United States Patent
Fukui et al.

(10) Patent No.: US 9,857,044 B2
(45) Date of Patent: Jan. 2, 2018

(54) LIGHTING APPARATUS AND AUTOMOBILE HAVING LIGHTING APPARATUS MOUNTED THEREIN

(71) Applicant: Panasonic Intellectual Property Management Co., Ltd., Osaka (JP)

(72) Inventors: Atsushi Fukui, Osaka (JP); Shohroh Mochida, Osaka (JP); Takayuki Yamaguchi, Osaka (JP); Tomoyuki Ogata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 188 days.

(21) Appl. No.: 14/787,466

(22) PCT Filed: Jul. 9, 2014

(86) PCT No.: PCT/JP2014/003632
§ 371 (c)(1),
(2) Date: Oct. 27, 2015

(87) PCT Pub. No.: WO2015/004910
PCT Pub. Date: Jan. 15, 2015

(65) Prior Publication Data
US 2016/0084469 A1 Mar. 24, 2016

(30) Foreign Application Priority Data
Jul. 10, 2013 (JP) .................... 2013-144247

(51) Int. Cl.
*G02B 3/06* (2006.01)
*F21S 8/10* (2006.01)
(Continued)

(52) U.S. Cl.
CPC ........ *F21S 48/2212* (2013.01); *B60Q 1/2653* (2013.01); *B60Q 1/28* (2013.01);
(Continued)

(58) Field of Classification Search
None
See application file for complete search history.

(56) References Cited

U.S. PATENT DOCUMENTS

2004/0008516 A1   1/2004   Amano
2006/0151809 A1   7/2006   Isokawa
(Continued)

FOREIGN PATENT DOCUMENTS

CN   101922667    12/2010
DE   102011052351  2/2012
(Continued)

OTHER PUBLICATIONS

English Translation of Chinese Search Report dated Oct. 18, 2016 for the related Chinese Patent Application No. 201480019439.7.
(Continued)

*Primary Examiner* — Britt D Hanley
(74) *Attorney, Agent, or Firm* — Panasonic IP Management; Kerry S. Culpepper (57) ABSTRACT

An illumination apparatus includes an LED, a first lens unit provided above the LED and a cylindrical lens provided above the first lens unit. The first lens unit receives light from the LED and emits the light toward the cylindrical lens. The cylindrical lens emits the light to the outside.

19 Claims, 10 Drawing Sheets

(51) Int. Cl.
*B60Q 1/26* (2006.01)
*B60Q 1/28* (2006.01)
*G02B 3/04* (2006.01)
*G02B 19/00* (2006.01)
*G02B 3/00* (2006.01)

(52) U.S. Cl.
CPC .......... *F21S 48/215* (2013.01); *F21S 48/218* (2013.01); *F21S 48/236* (2013.01); *F21S 48/24* (2013.01); *G02B 3/04* (2013.01); *G02B 3/06* (2013.01); *G02B 19/0009* (2013.01); *G02B 19/0066* (2013.01); *B60Q 2400/30* (2013.01); *G02B 3/005* (2013.01)

(56) References Cited

U.S. PATENT DOCUMENTS

| | | |
|---|---|---|
| 2012/0033441 A1 | 2/2012 | Sousek et al. |
| 2012/0057363 A1 | 3/2012 | Ishida et al. |
| 2012/0250331 A1 | 10/2012 | De Lamberteire |

FOREIGN PATENT DOCUMENTS

| | | |
|---|---|---|
| JP | 62-229701 | 10/1987 |
| JP | 3-106605 U | 11/1991 |
| JP | 2004-363210 | 12/2004 |
| JP | 2010-067417 | 3/2010 |
| JP | 2010-287397 | 12/2010 |
| JP | 2011-029781 | 2/2011 |
| JP | 2011-249047 | 12/2011 |
| JP | 2012-059409 | 3/2012 |
| JP | 2012-199161 | 10/2012 |
| JP | 2012-216542 | 11/2012 |

OTHER PUBLICATIONS

The Extended European Search Report dated Jul. 21, 2016 for the related European Patent Application No. 14823672.2.
International Search Report of PCT application No. PCT/JP2014/003632 dated Sep. 2, 2014.

A-A CROSS SECTION

A-A CROSS SECTION

RELATED ART

[FIG. 15]

RELATED ART

LIGHTING APPARATUS AND AUTOMOBILE HAVING LIGHTING APPARATUS MOUNTED THEREIN

CROSS-REFERENCE TO RELATED APPLICATIONS

This application is a U.S. national stage application of the PCT International Application No. PCT/JP2014/003632 filed on Jul. 9, 2014, which claims the benefit of foreign priority of Japanese patent application 2013-144247 filed on Jul. 10, 2013, the contents all of which are incorporated herein by reference.

TECHNICAL FIELD

The present invention relates to a vehicle light using a light emitting diode (LED) or the like as a light source, and particularly relates to a vehicle light (a so-called daytime running light (DRL)) for allowing drivers of other vehicles, pedestrians and so on to visually recognize the existence of a vehicle during daytime.

BACKGROUND ART

The DRL has been now standardized in Europe and so on, and is becoming standardized in the United States and other countries. As for broadening of light, a light source having light broadening in a right and left direction (horizontal direction) with respect to an upper and lower direction (vertical direction) is required.

Figure 14:
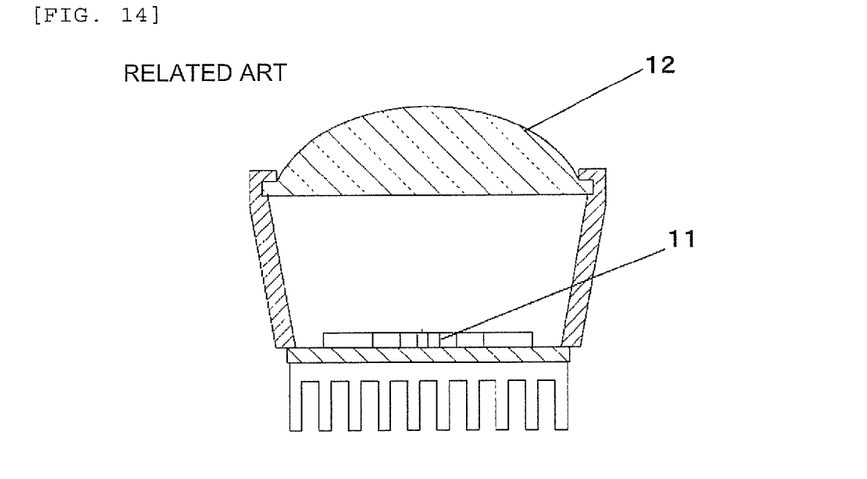
FIG. 14 is a view showing a related-art illumination device for daytime running described in Patent literature 1.

As a related-art daytime running light (DRL), there exists an illumination device in which a light emission amount and the number of light emissions in an LED array are changed so that light distribution becomes suitable for daytime running by reducing illumination of a high beam of a headlight (for example, refer to Patent Literature 1). FIG. 14 is a view showing a related-art illumination device for daytime running described in Patent literature 1.

In FIG. 14, the illumination device includes an LED array 11 in which plural LEDs are aligned and a lens 12. Light emitted from the LED array 11 is collimated by the lens 12. Light from LEDs close to an optical axis of the lens 12 becomes light in an optical axis direction, namely, a front direction, and light from LEDs apart from the optical axis of the lens 12 becomes light in a right and left direction, which are emitted from the lens 12. The light distribution becomes suitable for daytime running light by adjusting the light amount of respective LEDs of the LED array 11.

Figure 15:
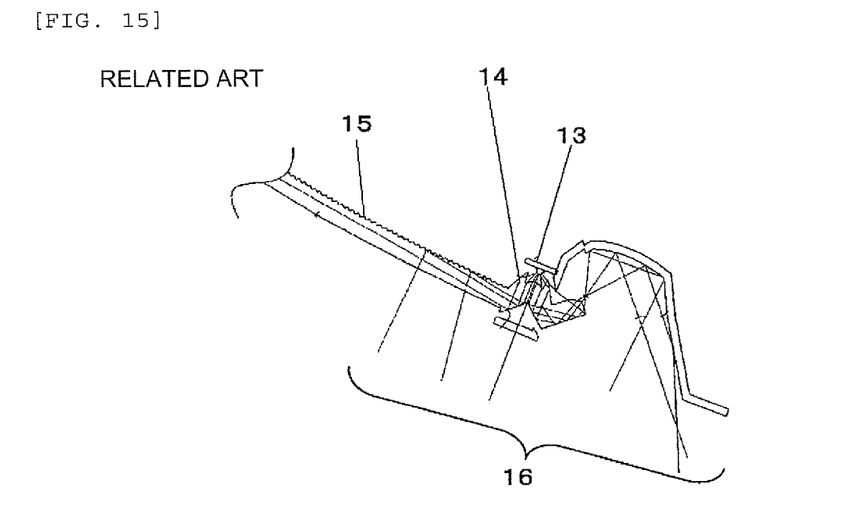
FIG. 15 is a view showing a related-art illumination device for daytime running described in Patent literature 2.

There is also a device in which a line-shaped light source is formed by using a light guide plate (for example, refer to Patent Literature 2). FIG. 15 is a view showing a related-art daytime running light described in Patent literature 2. In FIG. 15, the illumination device includes a high output LED 13 and a light guide plate 14. The light guide plate 14 has prisms 15 formed at an end face thereof.

Light emitted from the high output LED 13 is incident on the light guide plate 14 and propagates inside the light guide plate 14 while being totally reflected. When the light propagating inside the light guide plate 14 is incident on the prisms 15, optical paths of part of the light are bent by the prisms 15, therefore, the light is deviated from the total reflection condition and emitted to the outside of the light guide plate 14. A light 16 is emitted from the entire light guide plate 14.

CITATION LIST

Patent Literature

PTL 1: JP-A-2010-67417
PTL 2: JP-A-2011-29781

SUMMARY OF INVENTION

According to an embodiment of the present invention, an illumination device includes an LED, a lens unit provided above the LED and a cylindrical lens provided above the lens unit, in which the lens unit receives light from the LED and emits the light toward the cylindrical lens, and the cylindrical lens emits the light to the outside.

The illumination device according to the present invention is provided with the first lens unit in which a lens and a total reflection prism are integrated and the cylindrical lens, in which broadening of light is formed in the upper and lower (vertical) direction and the right and left (horizontal) direction in a fixed range by the first lens unit, and broadening of light is further formed in the right and left direction by the second lens, and the first lens unit is apart frosts the cylindrical lens by a predetermined distance, thereby forming a light source having a uniform line shape when seen from the front.

Most of the light incident on the lens in the emitted light from the LED is emitted to the front direction, and light leaking to the periphery is reduced by the total reflection prism to be light irradiated to the front direction, which forms an efficient light source.

DESCRIPTION OF EMBODIMENTS

Problems in the related-art structure will be explained prior to the explanation of embodiments of the present invention. In the related-art structure, it is difficult to change an outer shape of an illumination device freely as an illumination device for a daytime running light. There is little degree of freedom in arrangement such that the illumination device is arranged in a line shape at a front inclined part of a vehicle body so that other drivers and pedestrians can see the light easily.

Also in the illumination device for the daytime running using a light guide plate, a line-shaped light source with excellent visibility and designability can be easily formed and the degree of freedom in arrangement is nigh. However, there is a problem that light efficiency is low. As a loss is caused when the light is incident on the light guide plate from the LED and a large loss is further caused when the light is taken from the light guide plate, the efficiency is generally extremely low.

Hereinafter, embodiments of the present invention for solving the above problems in related art will be explained with reference to the drawings. An object of the present invention is to provide an illumination device which can be formed in a line shape with high light efficiency, high degree of freedom in arrangement and excellent visibility and designability.

(Embodiment 1)

Figure 1A:
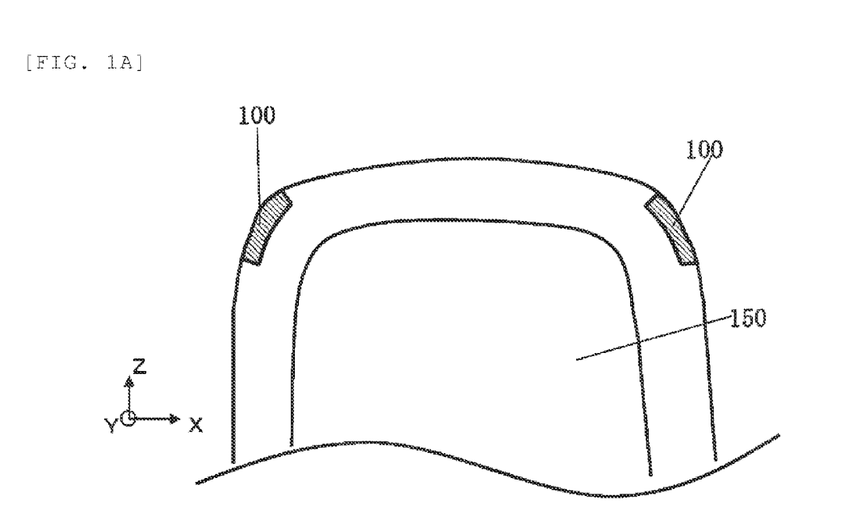
FIG. 1A is a view showing positions of illumination devices in a motor vehicle.
Figure 1B:
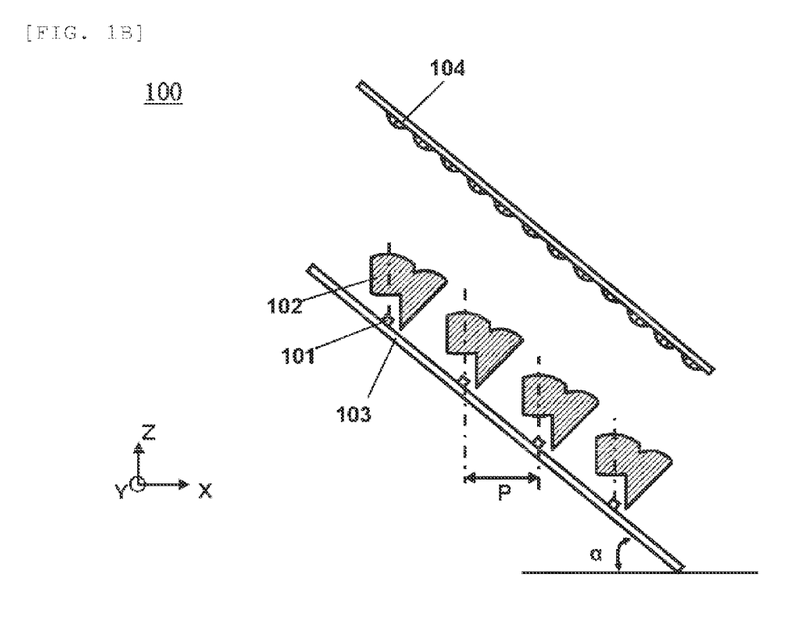
FIG. 1B is a cross-sectional view of an illumination device according to Embodiment 1.

FIG. 1A is a view showing positions of illumination devices 100 according to Embodiment 1 in a motor vehicle. FIG. 1B is a cross-sectional view of the illumination device 100 for daytime running of a vehicle according to Embodiment 1.

FIG. 1A is a top view of a front part of a motor vehicle 150. The illumination devices 100 are arranged on the right and left of the front part, which are oblique portions at corners. Though the illumination devices 100 are obliquely arranged, it is necessary to emit uniform light seen from a principal surface. It is also necessary to broaden the light more in a horizontal direction. That is because there are people, other motor vehicles and so on in the horizontal direction.

In FIG. 1A and FIG. 1B, an upper side of the page is set as a Z-axis direction, a right direction is set as an X-axis direction and a depth direction of the page is set as a Y-axis direction as coordinate axes. The Z-axis direction corresponds to the front direction (a front part and a rear part of the motor vehicle), the Y-axis direction corresponds to an upper and lower direction (vertical direction) and the X-axis direction corresponds to a right and left direction. FIG. 1A and FIG. 1B are views seen from the same direction.

In FIG. 1B, each illumination device 100 includes an LED substrate 103, first lens units 102 in the front direction (upper direction in the drawing) of the LED substrate 103 and a second lens 104 in the front direction (upper direction in the drawing) of the first lens units 102. The illumination device 100 is inclined at an inclined angle α with respect to the X-axis (right and left direction).

LEDs 101 are arranged on the LED substrate 103. The LEDs 101 are arranged at approximately equal intervals on the LED substrate 103. The front direction is the Z-axis direction and the LED substrate 103 is arranged so as to be inclined with respect to the front. The illumination devices 100 are obliquely arranged with respect to the front (Z-axis direction) as shown in FIG. 1A.

Light with a distribution close to perfectly diffused light is emitted from the LEDs 101. One first lens unit 102 is provided so as to correspond to one LED 101. The first lens unit 102 emits light with high directivity close to parallel light by using light emitted from the LED 101 as incident light. The second lens 104 is arranged almost in parallel to the LED substrate 103, and a cylindrical lens array is formed on the LEDs 101 side (explained in FIG. 3). The cylindrical lenses 123 are arranged so that the axial direction (longitudinal direction of a pillar shape) is parallel to the Y axis, and the light is diffused in an XY plane.

(First Lens Unit 102)

Figure 2A:
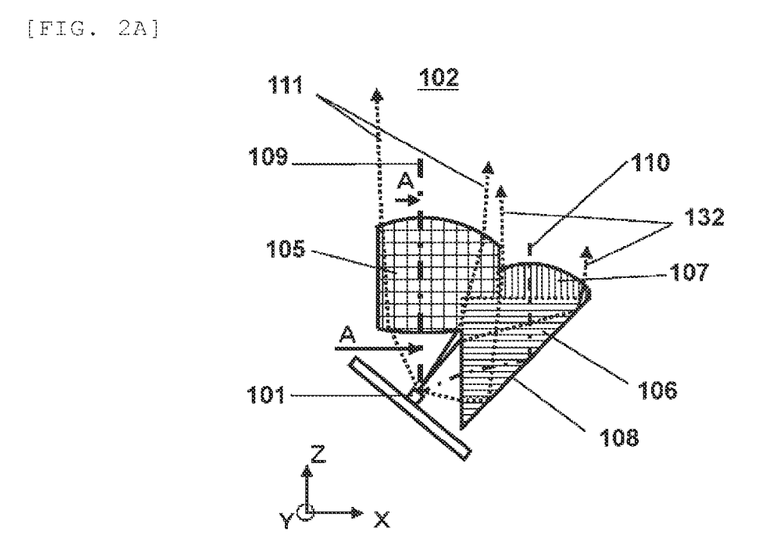
FIG. 2A is a cross-sectional view showing a first lens unit in an XZ plane according to Embodiment 1.

FIG. 2A is a cross-sectional view showing a structure of the first lens unit 102. The first lens unit 102 includes a first lens portion 105, a second lens portion 107 and a triangular prism 106.

The first lens portion 105 is arranged so that a lens central axis 109 is almost parallel to the Z-axis direction (front direction) and so that the center of a light emitting surface of the LED 101 corresponds to the vicinity of a focal position.

The triangular prism 106 is positioned in a side surface of the first lens portion 105. The triangular prism 106 includes three apexes with angles of 90 degrees, 45 degrees and 45 degrees. An optical path of light is changed by total reflection on a slope.

The second lens portion 107 is positioned in an upper part of the triangle prism 106 as well as in the side surface of the first lens portion 105. The second lens portion 107 is arranged so that a lens central axis 110 is almost parallel to the Z axis and so that the center of a light emitting surface of the LED 101 corresponds to the vicinity of a fecal position in consideration of an optical path length and the bending of the optical path due to the triangular prism 106.

The first lens 105 and the second lens 107 are preferably aspherical for reducing aberration. The first lens 105, the triangular prism 106 and the second lens 107 are integrally formed without an interface, and are formed of a transparent member such as glass, polycarbonate, acrylic or the like having the same refractive index.

The LED 101 is arranged in the vicinity of the focal planes of the first lens 105 and the second lens 107 in the above description, and more specifically, the LED 101 is arranged with defocusing so that broadening of emitted light from the first lens 105 and the second lens 107 will be broadening of light having a specified value in an upper and lower direction (Z-axis direction).

A width of the first lens unit 102 in the X-axis direction is a size which is the same as or slightly larger than an LED pitch P when seen from the Z-axis direction, so that the first lens units 102 are arranged without a gap when seen from the Z-axis direction.

The first lens 105 and the second lens 107 have a shape in which sides of a right and left direction (X-axis direction) are cut so as to be perpendicular to the X axis. The light from the LED 101 does not reach the cut areas or little light reaches the areas. Portions overlapping the adjacent first lens unit 102 (seen from the Z-axis) are cut.

Figure 2B:
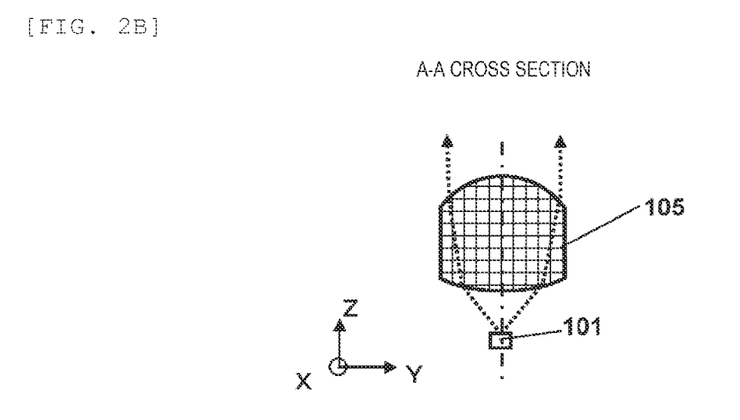
FIG. 2B is a cross-sectional view showing the first lens unit in an YZ plane according to Embodiment 1.

FIG. 2B shows a cross section (a YZ plane) taken along A-A passing the central axis of the first lens 105 of the first lens unit 102. It is found that the light from the LED 101 is collected to a fixed specified range.

(Second Lens)

Figure 3A:
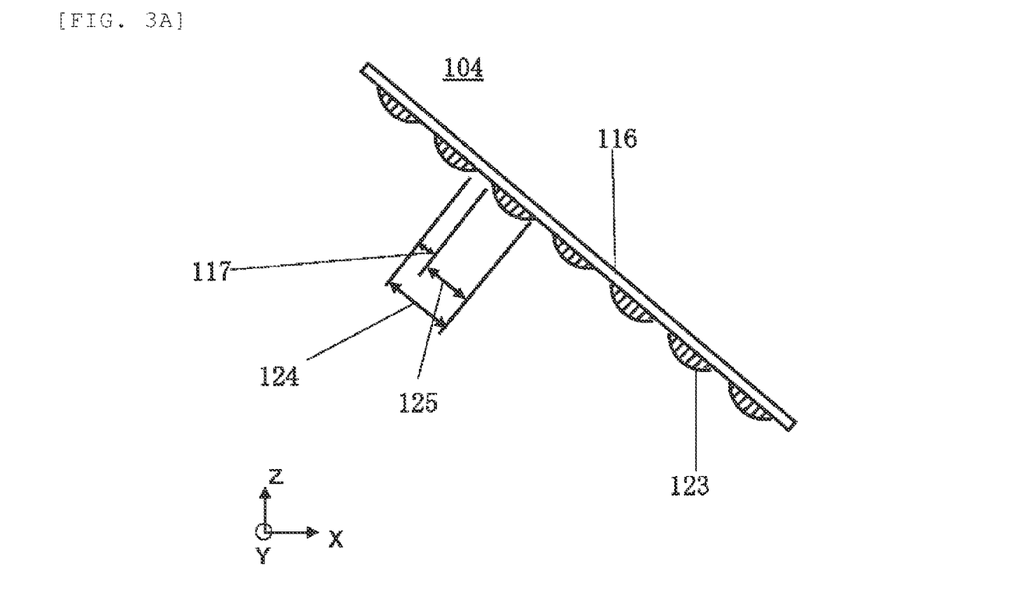
FIG. 3A is a cross-sectional view of a second lens according to Embodiment 1.

FIG. 3A shows a schematic cross-sectional view of the second lens 104. The second lens 104 includes a substrate 116 and cylindrical lenses 123. The substrate 116 is a transparent substrate having a fixed thickness and made of glass, polycarbonate, acrylic or the like. The cylindrical lenses 123 are arranged on the LEDs 101 side (Z-axis negative side) of the substrate 116 and a cylindrical axis (central axis) of the cylindrical lenses 123 is formed in parallel to the Y axis. The cylindrical lenses 123 are arranged at equal intervals so that a cylindrical lens forming area 125 is slightly smaller than a cylindrical lens pitch 124.

That is to say, there are planar portions 117 in which the cylindrical lenses 123 are not formed in the substrate 116. The effect of broadening the light by the second lens 104 can be reduced by providing the planar portions 117 with respect to the cylindrical lens forming areas 125. As a result, the broadening of light inside the XY plane can be reduced and the light amount in the Z-axis direction can be increased. However, the broadening of light in the XY plane (right and left direction) becomes too small when the planar portions 117 are too large, therefore, the ratio of the planar portion 117 with respect to the cylindrical lens pitch 124 is set to approximately 1 to 20%.

The second lens 104 may be rotated with respect to the LED substrate 103 so that the cylindrical axis of the cylindrical lens 123 is slightly rotated around the Z axis. This is because the distribution of emitted light from the second lens 104 can be adjusted. That is, the cylindrical axis is not vertical but is inclined at the angle introduced below with respect to a line in which the LEDs 101 are aligned.

Figure 3B:
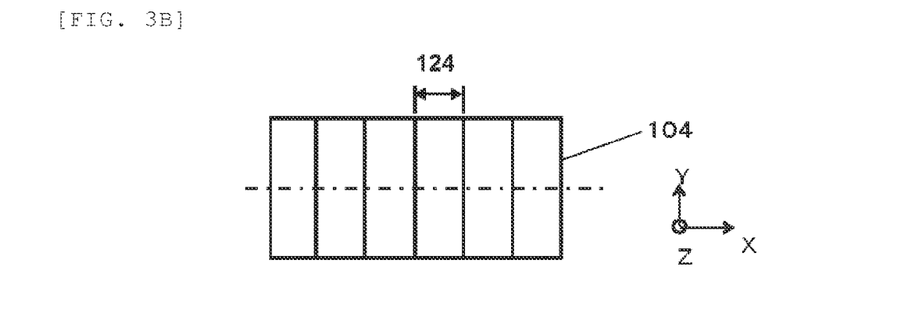
FIG. 3B is a cross-sectional view of a second lens according to Embodiment 1.
Figure 3C:
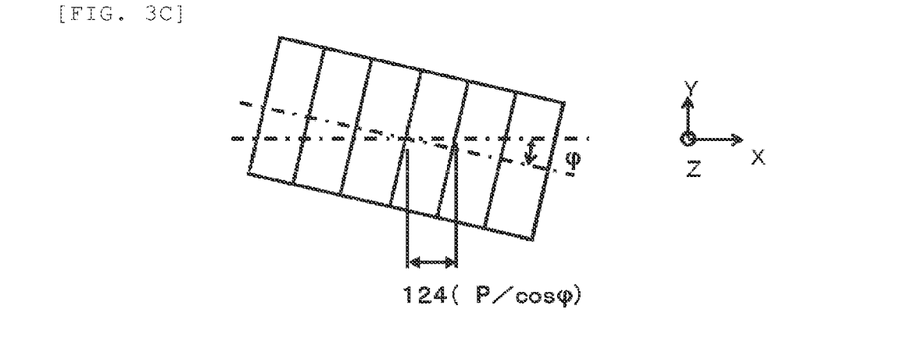
FIG. 3C is a plan view of the second lens according to Embodiment 1, which is seen from a Z-axis direction.

Next, the reason why it is preferable that the second lens 104 is rotated around the Z axis will be explained. FIG. 3B and FIG. 3C show the second lens 104 seen from the Z-axis direction. FIG. 3B shows a state or not being rotated, and FIG. 3C shows a state in which the second lens 104 is rotated around the Z axis at a rotation angle $\phi$.

When the cylindrical axis of the cylindrical lens 123 is rotated around the Z axis slightly at the rotation angle $\phi$, the cylindrical lens pitch 124 of the second lens 104 inside the XY plane becomes $1/\cos \phi$ times after the rotation at the rotation angle $\phi$, which is increased in appearance.

As a result, a curvature radius of the cylindrical lenses 123 is increased and the effect of broadening the light inside the XZ plane by the second lens 104 is reduced. Accordingly, it is useful for the optical adjustment performed when it is desirable to slightly narrow the broadening of light in the XZ plane (right and left direction) and to increase the light amount in the Z-axis direction.

However, when the rotation amount around the Z axis of the cylindrical axis of the cylindrical lens 123 is too large, a broadening component is generated also in the YZ plane (upper and lower direction) and a distortion occurs in the broadening of light, therefore, it is desirable that the adjustment amount is approximately 0 to 10 degrees. The adjustment amount is preferably 0 to 5 degrees.

Here, a columnar lens or a cylindrical lens is preferable to be used as the cylindrical lens 123 as shown in FIG. 1B and FIG. 3A. It is also preferable to use lenses having a columnar shape or a cylindrical shape, in which part of the lens is expanded in a radial direction. A lens having a polygonal shape in cross section can be used. The number of angles is preferably five or more.

(Operation)

The operation of the illumination device for daytime running configured as described above will be explained with reference to FIG. 2A.

Front rays of light 111 emitted to the Z-axis direction (front direction) from the LED 101 are incident on the first lens unit 102 as shown in FIG. 2A. As the center of the light emitting surface of the LED 101 is arranged in the vicinity of the focal position of the first lens 105, the front rays of light 111 emitted from the first lens 105 will be light having broadening specified in the upper and lower direction (Y-axis direction).

Oblique rays of light 132 emitted from the LED 101 in the same manner having a component of an obliquely right upward direction (direction inclined from the Z axis to the X-axis direction) in the drawing are incident on the triangular prism 106. The light incident on the triangular prism 106 is totally reflected on the prism slope (a total reflection surface 108) and incident on the second lens 107. As the center of the light emitting surface of the LED 101 is arranged in the vicinity of the focal position of the second lens 107, the oblique rays of light 132 emitted from the second lens 107 will be light having broadening specified in the upper and lower direction (Y-axis direction).

The broadening of light emitted from the first lens unit 102 has the specified value in the upper and lower direction (YZ plane) and right and left direction (XZ plane). The light emitted from the first lens unit 102 is increased so that a broadening angle of light becomes a broader specified value by the cylindrical lenses 123 with respect to the right and left direction (XZ plane) by the second lens 104.

(Intervals of the First and Second Lenses)

An interval L between the second lens 104 and the first lens unit 102 will be explained with reference to FIG. 4A and FIG. 4B.

Figure 4A:
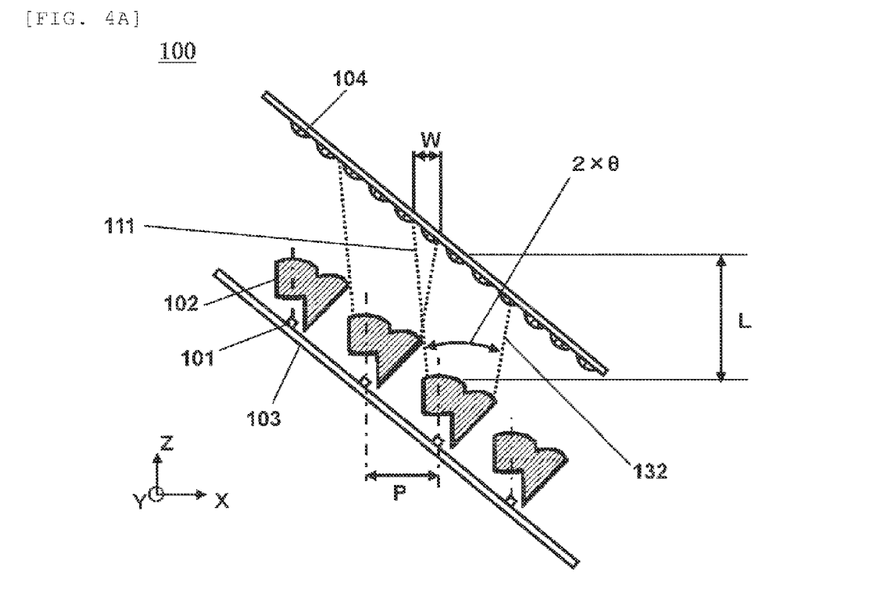
FIG. 4A is a cross-sectional view of the illumination device according to Embodiment 1.
Figure 4B:
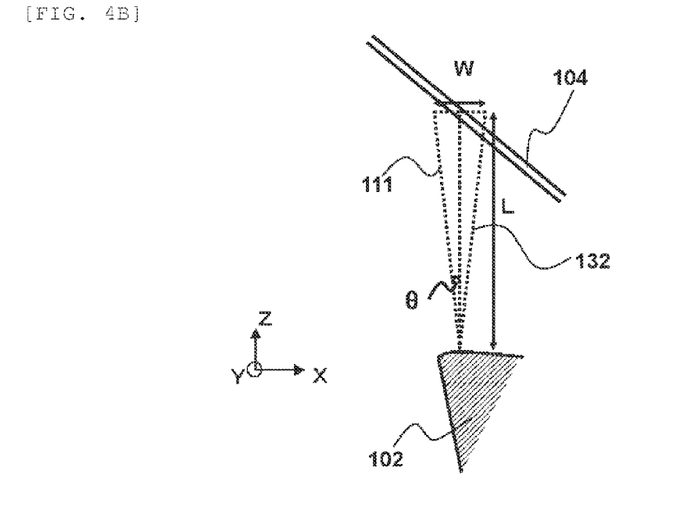
FIG. 4B is a view showing a positional relationship of overlapping of light between the first lens unit and the second lens.

FIG. 4A is a cross-sectional view of the illumination device 100. The drawing corresponds to FIG. 1B. FIG. 4B is an enlarged view showing a positional relationship between the first lens unit 102 and the second lens 104 in FIG. 4A.

In the interval between the second lens 104 and the first lens unit 102, it is considered that a light overlapping width w between adjacent first lens units 102 requires at least ¼ or more of the LED pitch P on the second lens 104 for recognizing light to be continuous in the X-axis direction when seen from the Z-axis direction (Expression 1).

In order to allow the illumination device 100 to be recognized as a continuous line-shaped light source when the illumination device 100 is seen, it is necessary that lights from the first lens unit 102 overlap to some degree on the second lens 104. Intervals between the first lens units 102 are seen dark if the lights do not overlap, therefore, overlapping of at least 1/10 or more, preferably 1/4 or more is necessary.

When a half width at half maximum of the broadening angle of light from the first lens unit 102 is θ, the LED pitch in the X-axis direction is P, the distance between the first lens unit and the second lens in the Z-axis direction is the interval L and the overlapping width of light is W, a relation shown by an expression 2 is obtained.

$$W > P/4 \quad \text{(Expression 1)}$$

$$W = 2 \times \tan\theta \times L \quad \text{(Expression 2)}$$

$$2 \times \tan\theta \times L > P/4 \quad \text{(Expression 3)}$$

can be obtained from Expressions 1 and 2. Accordingly, the interval L between the first lens unit 102 and the second lens 104 is $$L > P/(8 \times \tan\theta) \quad \text{(Expression 4)}$$

For example, when the half width at half maximum of the first lens unit 102 is 7 degrees and the LED pitch in the X-axis direction is 10 mm, the interval L between the first lens unit 102 and the second lens 104 is L>10/(8×tan 7°)≈10.2 mm, therefore, they are set with an interval of at least 10.2 mm or more.

(Travelling Direction of Light)

Figure 5A:
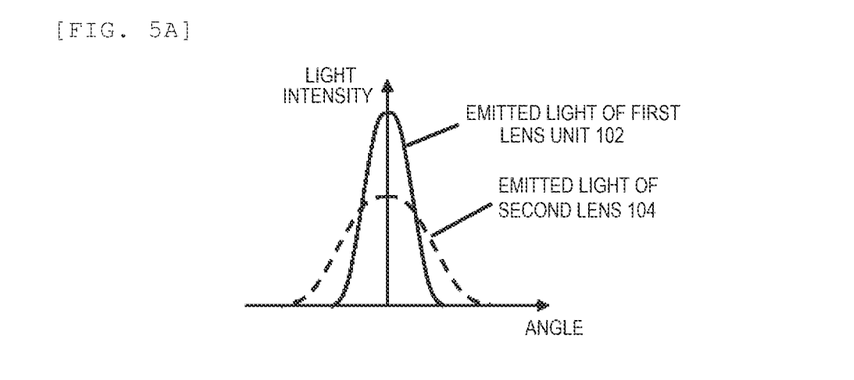
FIG. 5A is a diagram showing intensity distribution of light emitted from the first and second lenses with respect to angles in a right and left direction according to Embodiment 1.
Figure 5B:
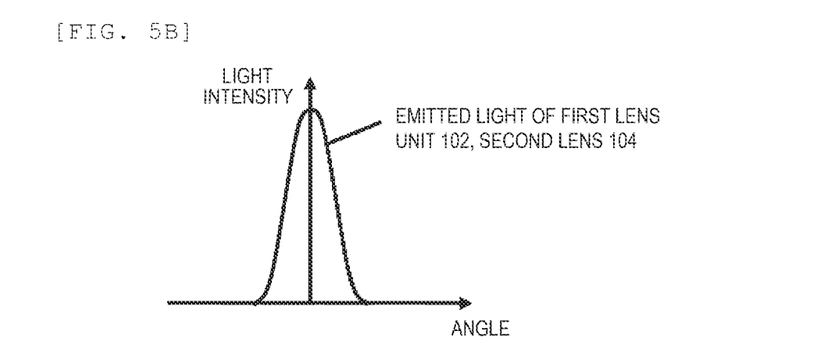
FIG. 5B is a diagram showing intensity distribution of light emitted from the first and second lenses with respect to angles in an upper and lower directions according to Embodiment 1.
Figure 5C:
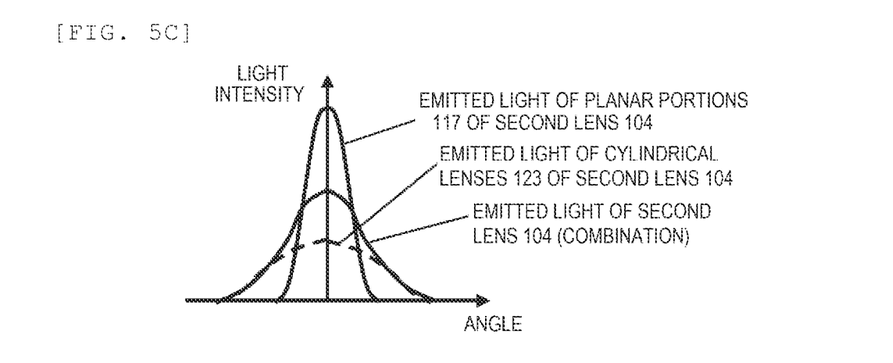
FIG. 5C is a diagram showing intensity distribution of light emitted from planar portions of the second lens and cylindrical lens portions with respect to angles in the right and left direction according to Embodiment 1.

FIG. 5A to FIG. 5C show distribution diagrams indicating the broadening of light. FIG. 5A snows the broadening of light in the right and left direction (in the XZ plane). The broadening angle in emitted light of the second lens 104 is wider than emitted light of the first lens unit 102.

FIG. 5B shows the broadening of light in the upper and lower direction (in the YZ plane). The broadening of light in the upper and lower direction (in the YZ plane) is a broadening of a specified value in the first lens unit 102, and the light is directly transmitted in the second lens 104. The cylindrical lenses 123 of the second lens 104 are arranged at equal intervals.

FIG. 5C shows the broadening of light in the right and left direction (in the XZ plane) concerning respective cylindrical lenses 123 and the planar portions 117 of the second lens 104 and combinations thereof. The light transmitted through the planar portion 117 where the cylindrical lenses 123 are not formed is a sharp light having the same broadening angle as the emitted light from the first lens unit 102. On the other hand, the light transmitted through the cylindrical lenses 123 has a wider broadening angle. The broadening of light in the right and left direction (in the XZ plane) is formed by overlapping (combining) these two lights.

As the light intensity is necessary particularly in the front direction (Z-axis direction) in the angle distribution of light, the light passing through the cylindrical lenses 123 is combined with the light passing through the planar portions 117 without the cylindrical lens, thereby adjusting the angle distribution easily.

As the light emitted from the first lens unit 102 has the broadening angle, lights between the first lens units 102 which are adjacent on the second lens 104 overlap. The intensify distribution is alleviated by the light diffusion effect due to the cylindrical lenses 123 of the second lens 104, therefore, the line-shaped light source can be recognized when seen from the front direction (Z-axis direction).

(Advantages)

According to the above structure, the first lens units 102 in which the lens and the total reflection prism are integrated and the second lens 104 in which the cylindrical lens array is arranged are included, in which the broadening of light in the upper and lower direction is formed by the first lens units 102 and the broadening of light in the right and left direction is formed by the second lens 104, and the distance between the first lens units 102 and the second lens 104 is sufficiently increased, thereby allowing the light source to be recognized in the line shape when seen from the front.

Additionally, most of light incident on the lenses in emitted light from the LEDs 101 is emitted in the front direction, and light leaking to the periphery is reduced by the total reflection prisms to be light irradiated in the front direction, thereby obtaining the efficient light source.

(Embodiment 2) Pillar-Shaped Lens 123

Figure 6:
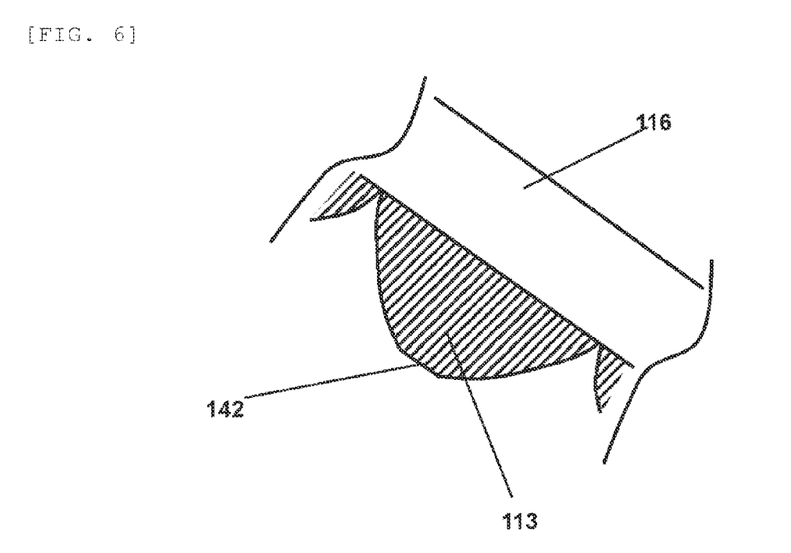
FIG. 6 is a cross-sectional view of a second lens according to Embodiment 2.

The cylindrical lenses 123 has been explained as the convex shape, however, almost the same effects in optical characteristics can be obtained when forming the cylindrical lenses 123 in a concave shape. FIG. 6 is an enlarged cross-sectional view of another example of the cylindrical lens 123. As shown in FIG. 6, the same effects can be obtained also when a flat portion 142 is formed in an apex, part of the cylindrical lens. The flat portion 142 is on an apex of the cylindrical lens 123. The flat portion 142 is a surface parallel to the surface of the substrate 116. The cylindrical lenses 113 are arranged without a gap. The length of the flat portion 142 is the same as the planar portion. 117 in FIG. 3.

Although the cylindrical lenses 123 are formed on the LED 101 side in the substrate 116, the cylindrical lenses 123 may be formed on the opposite side (outer side). It is also preferable that the cylindrical lenses 123 are arranged on both sides.

A cross sectional shape of the cylindrical lens 123 may be a spherical surface shape or an aspherical surface shape. The structure is the same as the structure in Embodiment 1 except the above.

(Embodiment 3) Modification of First Lens Unit, Y-axis direction

Figure 7:
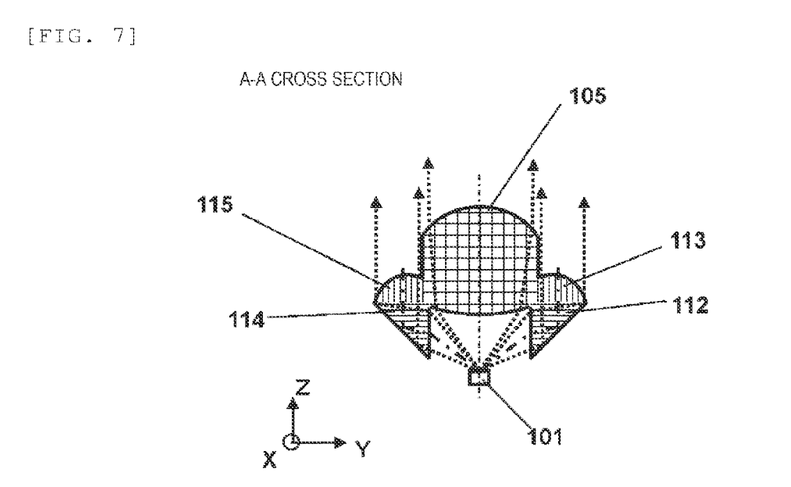
FIG. 7 is a cross-sectional view showing the first lens unit in an YZ plane according to Embodiment 3.

As the structure of the first lens unit 102, the A-A cross section, in FIG. 2A is shown in FIG. 2B. A modification example of that is shown in FIG. 7. As shown in FIG. 7, it is preferable that the direction of lights leaking from the LED 101 to the periphery is changed to the front direction by total reflection surfaces by using a triangular prism 112 and a triangular prism 114, and that the broadening of light in the upper and lower direction is formed by the fourth lens 113 and a fifth lens 115 also in the A-A cross section.

The triangular prisms 112, 114 and the fourth lens 113 and the fifth lens 115 can be integrally formed with the first lens 105. A focal distance of the fourth lens 113 is almost the same as the focal distance of the first lens 105 including an optical path length of the triangular prism 112. The focal position is also almost the same as that of the first lens 105.

Also in the fifth lens 115, the focal distance is almost the same as that of the first lens 105 including an optical path length of the triangular prism 114. The focal position is also almost the same as that of the first lens 105. Consequently the broadening angles of emitted light in the fourth lens 113 and the fifth lens 115 are almost the same as that of the first lens 105.

The emitted light from the LED 101 can be collected more by adding the fourth lens 113 and the fifth lens 115 as well as the triangular prism 112 and the triangular prism 114 to the first lens unit 102, therefore, the light efficiency can be improved. However, the width of the first lens unit in the upper and lower direction is increased when adding the fourth lens 113 and the fifth lens 115 as well as the triangular prism 112 and the triangular prism 114. That is, the line width of the line-shaped light source is increased. The structure is the same as the structure in Embodiment 1 except the above.

The optical loss can be improved approximately 5 to 20% by providing the triangular prism 112 and the triangular prism 114 though depending on the opening size and the focal distance of the first lens 105.

(Embodiment 4) Modification of First Lens Unit 102, X-axis Direction

Figure 8:
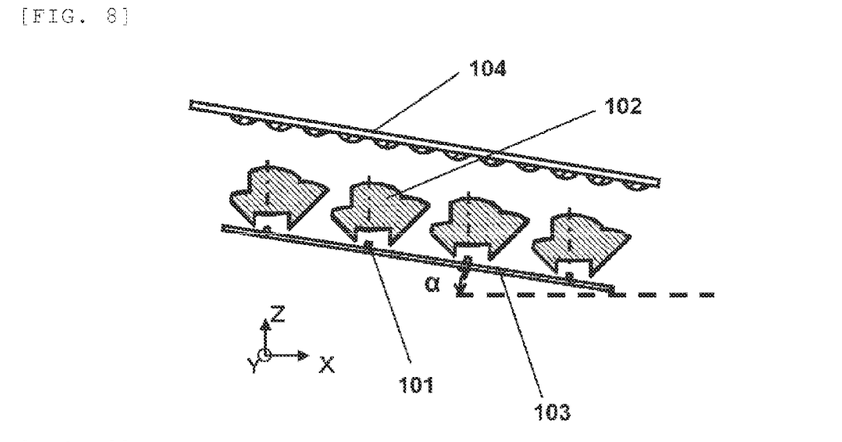
FIG. 8 is a cross-sectional view of an illumination device according to Embodiment 4.

The case in which the inclined angle α of the illumination device 100 is large is shown in FIG. 1 in Embodiment 1. FIG. 8 shows a cross-sectional view of the illumination device 100 in the case where the inclined angle α is small in FIG. 1B.

The light from the LED 101 tends to be emitted to positive and negative both sides in the X axis when the inclined angle α is approximately 0 to 30 degrees, therefore, the example of FIG. 8 in which the triangular prisms are arranged on both sides is preferable.

On the other hand, when the inclined angle α is large (larger than 30 degrees) as shown in FIG. 1B of Embodiment 1, it is desirable to dispose the triangular prism only on the side to which the light tends to be emitted. As the amount of emitted light from the LED 101 in the X-axis negative side is small, the triangular prism and the lens on the X-axis negative side are not provided.

Figure 9:
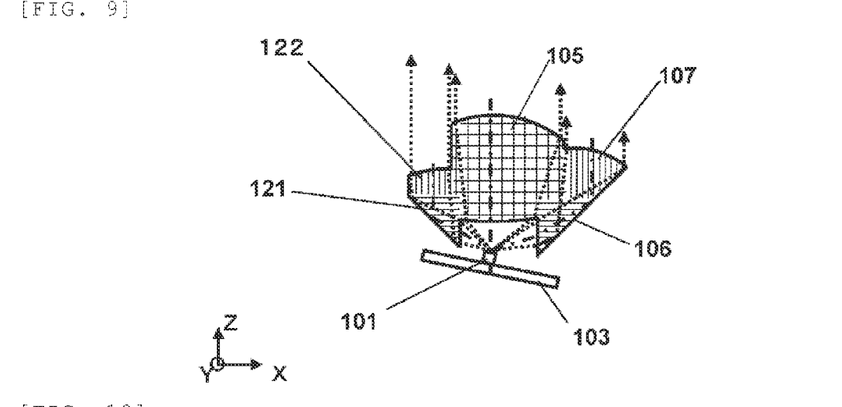
FIG. 9 is a cross-sectional view showing the first lens unit in the XZ plane according to Embodiment 4.

FIG. 8 is a cross-sectional view of the illumination device 100 configured when the inclined angle α is small. FIG. 9 is a cross-sectional view of the first lens unit 102 of FIG. 8.

The first lens unit 102 is provided with a triangular prism 121 and a third lens 122 also in the X-axis negative side. Accordingly, the optical loss from the LEDs 101 can be reduced.

A focal distance of the third lens 122 is made to be almost the same as the focal distance and the focal position of the first lens 105 including an optical path length of the triangular prism 121, therefore, the broadening angle of emitted light from the third lens 122 becomes almost the same as that of the first lens 105.

The emitted light from the first lens unit 102 has broadening when seen in the YZ plane, therefore, it is necessary to set the width of the second lens 104 to be wider than the width of the first lens unit 102 for preventing the loss of the light amount. When the width of the second lens is set to be the same width as the width of the first lens unit, the light amount of emitted light from the second lens is slightly reduced. The structure is the same as the structure in Embodiment 1 except the above.

(Embodiment 5) Example Using Reflector

Figure 10:
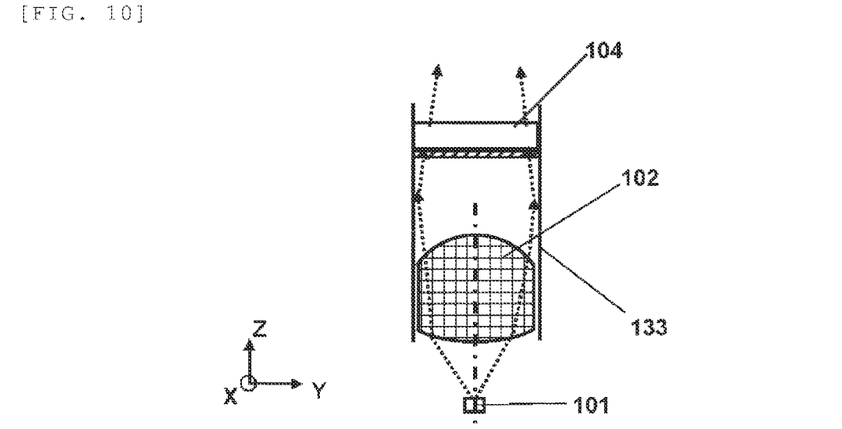
FIG. 10 is a cross-sectional view showing the first lens unit in the YZ plane according to Embodiment 5.

FIG. 10 is a cross-sectional view corresponding to FIG. 2B. As shown in FIG. 10, there are provided the first lens unit 102, the second lens 104 and a reflector 133 with a high reflectivity on a side surface between these lenses. As the reflector 133, for example, a mirror-finished aluminum plate can be arranged. Even when the second lens 104 having the same width as the first lens unit 102 is used, the width can be reduced with little variation in optical characteristics. The structure is the same as the structure in Embodiment 1 except the above.

(Embodiment 6) Modification Example of First Lens Unit 102

Figure 11:
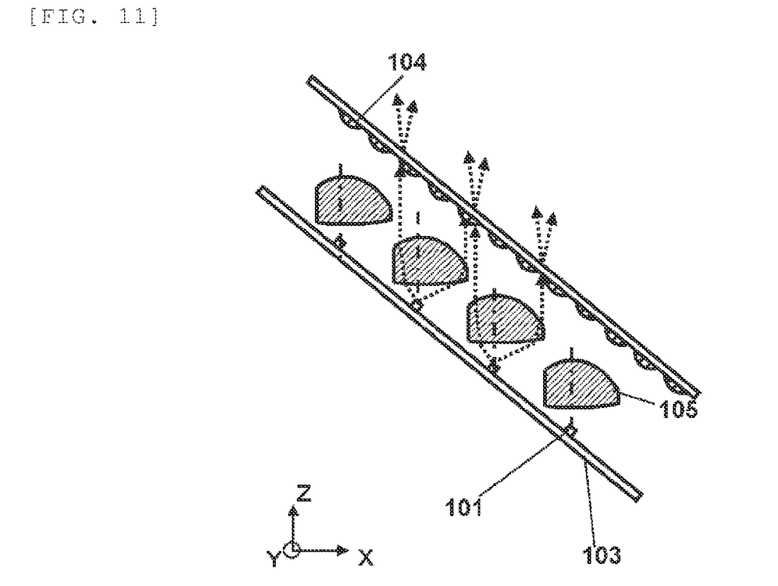
FIG. 11 is a schematic view of an illumination device according to Embodiment 6.

It is also possible to apply a structure in which only the first lens 105 is provided as the first lens unit 102 as shown in FIG. 11 if the optical loss from the LED 101 is allowable. FIG. 11 is a view corresponding to FIG 1B. The example differs only in the shape of the first lens units 102. The structure is the same as the structure in Embodiment 1 except the above.

The first lens unit 102 is configured only by the first lens 105. Accordingly, the shape is simplified and manufacturing costs can be reduced.

(Embodiment 7) Direction of Pillar-Shaped Lens 123

Figure 12A:
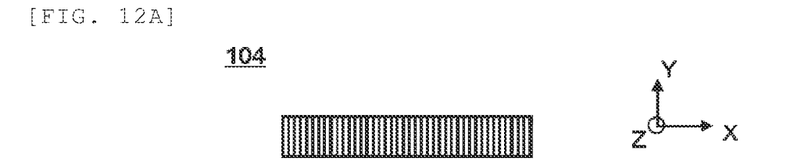
FIG. 12A is a front view of the second lens according to Embodiment 7 of the present invention.
Figure 12B:
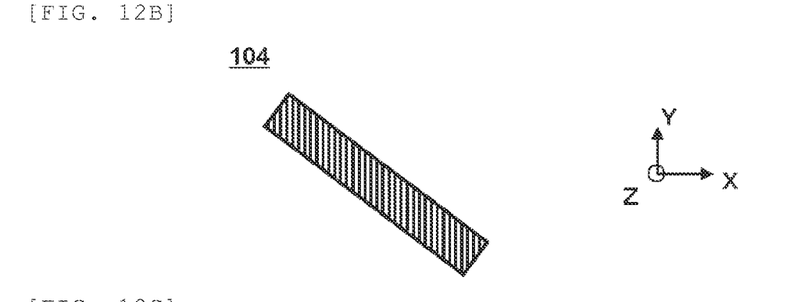
FIG. 12B is a front view of the second lens according to Embodiment 7 of the present invention.
Figure 12C:
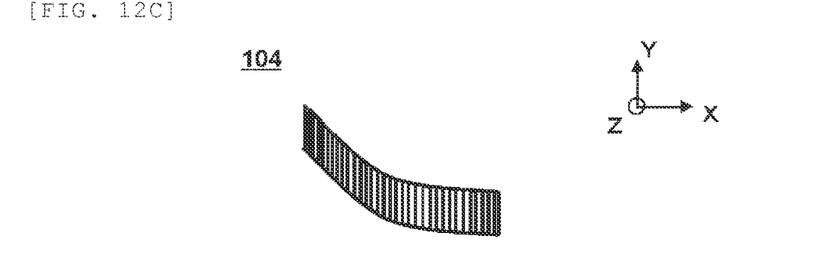
FIG. 12C is a front view of the second lens according to Embodiment 7 of the present invention.

FIG. 12A to FIG. 12C are front view (Z-axis direction) of the second lens 104. Diagonal lines indicate the axial direction (longitudinal direction) of the cylindrical lens 123. As explained in FIG. 1A and the like, the axis of the cylindrical lens 123 is parallel to the Y axis. The axis is parallel to the Y axis even when the illumination device is inclined or curved as shown in FIG. 12B and FIG. 12C. That is for broadening light to a direction perpendicular to the Y axis (a horizontal direction).

The light emitted from the first lens unit 102 converges at a fixed specified angle equally without directionality and is broadened in the horizontal direction by the second lens 104. The above direction is determined for broadening light in the horizontal direction when the illumination device 100 is attached to a motor vehicle. The structure is the same as the structure in Embodiment 1 except the above.

The first lens units 102 are arranged so as to correspond to shapes, namely, linear, oblique and curved shapes of the illumination device 100. It is not necessary to align the arrangement direction of the first lens units 102 with the axial direction of the cylindrical lenses 123.

(Embodiment 8) Modification of First Lens Unit 102

Figure 13A:
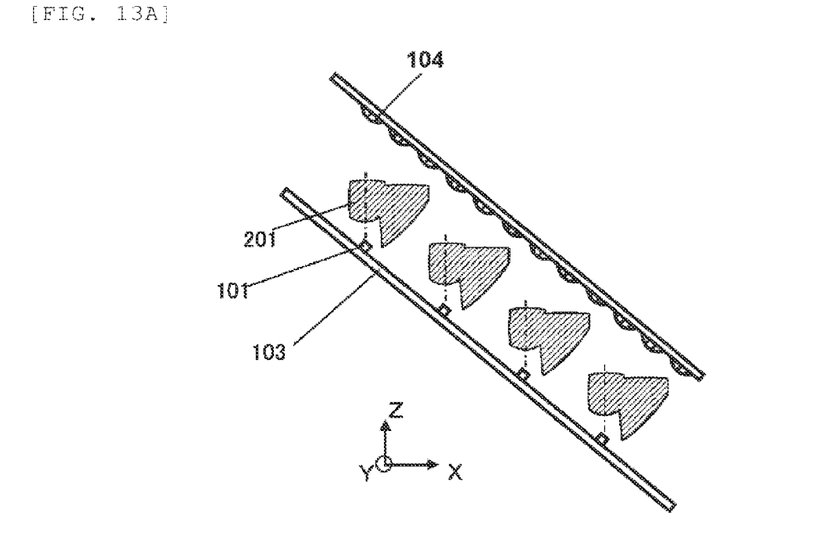
FIG. 13A is a cross-sectional view of an illumination device according to Embodiment 8.
Figure 13B:
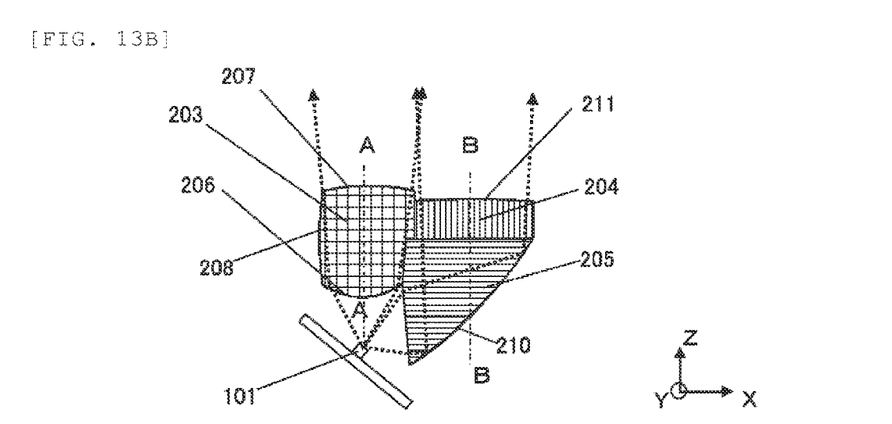
FIG. 13B is a cross-sectional view of a first lens unit according to Embodiment 8.
Figure 13C:
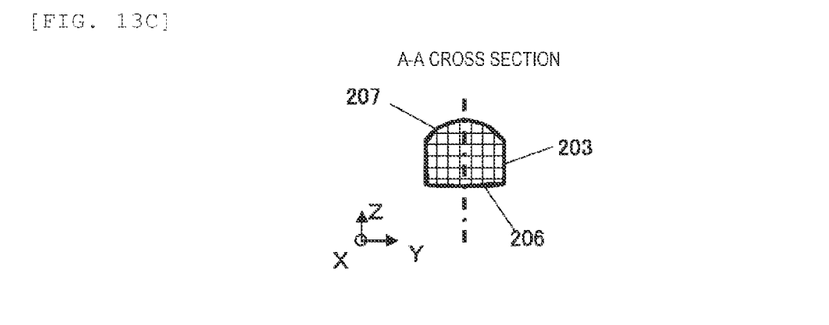
FIG. 13C is a cross-sectional view of an A-A plane of the first lens unit in FIG. 13B.
Figure 13D:
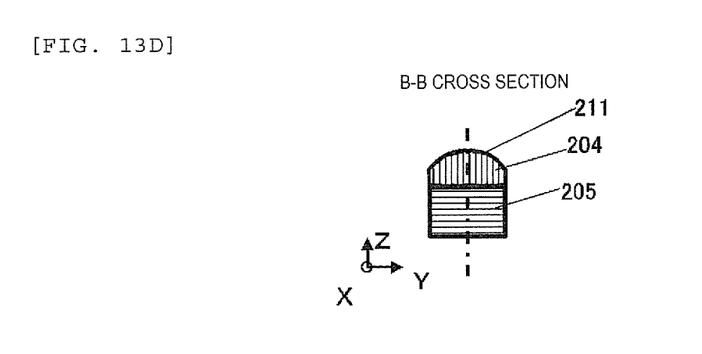
FIG. 13D is a cross-sectional view of a B-B plane of the first lens unit in FIG. 13B.

FIG. 13A to FIG. 13D show a modification of the first lens unit. The example has a structure different from the above embodiments in which the first lens unit 102 includes the spherical lens and the right-angled triangular prism. FIG. 13A is a cross-sectional view of the illumination device 100. FIG. 13B is a cross-sectional view of a first lens unit 201. FIG. 13C is an A-A cross-sectional view of the first lens unit 201. FIG. 13D is a B-B cross sectional view of the first lens unit 201.

As shown in FIG. 13B, the following unit is used as the first lens unit 201. There is provided a first lens 203 including a lens surface 206 (lower surface) having a cylindrical axis in the Y-axis direction, in which a cross section of an XZ plane is an aspherical surface and a lens surface 207 (upper surface) having a cylindrical axis in the X-axis direction, in which a cross section of a YZ plane is an aspherical surface.

Moreover, there is provided a prism 205 having a total reflection surface 210 (side surface) with an aspherical surface shape in a cross section of the XZ plane. Furthermore, there is formed a second lens 204 including a lens surface 211 (upper surface) having a cylindrical axis in the X-axis direction, in which a cross section of the YZ plane is an aspherical surface.

The lens surface 206 has the cylindrical axis in the Y-axis direction and collects light inside the XZ plane. The lens surface 207 has the cylindrical axis in the X-axis direction and collects light inside the YZ plane. A focal position of the lens surface 207 is in the vicinity of the LED 101, which is arranged at a defocused position so that emitted light from the first lens 203 has the broadening angle in the upper and lower direction (YZ plane).

The focal position of the lens surface 206 is in the vicinity of the LED 101, which is arranged at a defocused position so that a broadening angle of the emitted light from the first lens 203 in the right and left direction (XZ surface) becomes the same degree as that of the upper and lower direction (YZ plane).

In the total reflection surface 210 of the prism 205, a focal position is in the vicinity of the LED 101, which is arranged at a defocused portion so that broadening of emitted light from the second lens 204 in the right and left direction (XZ plane) becomes the same degree as the broadening of the first lens 203 in the right and left direction (XZ plane).

The lens surface 211 has the cylindrical axis in the X-axis direction and collects light in the upper and lower direction (YZ plane). A focal position of the lens surface 211 is in the vicinity of the LED 101, which is arranged at a defocused position so that broadening of emitted light from the lens surface 211 in the upper and lower direction (YZ plane) has the same degree as that of the first lens 203 in the upper and lower direction (YZ plane).

The same effects as Embodiment 1 can be obtained by using the first lens unit 201 having the above structure. Additionally, the directions acting on the collection of light in respective surfaces are separated to upper/lower and right/left, therefore, the broadening of light in the upper and lower direction and in the right and left direction can be easily adjusted.

It is also preferable that a columnar surface having the axis in the X-axis direction is added to the lens surface 206 to be a toroidal surface to give the effect of broadening light in the upper and lower direction to the lens surface 206 to some degree, thereby finely adjusting the broadening of light in the upper and lower direction also in the lens surface 206. Similarly, it is also preferable that a columnar surface having the axis in the Y-axis direction is added to the lens surface 207 to be a toroidal surface to give the effect of broadening light in the right and left direction to the lens surface 207 to some degree. Similarly, it is also preferable that a columnar surface having the axis in the Y-axis direction is added to the lens surface 211 to be a toroidal surface to give the effect of broadening light in the right and left direction to the lens surface 211 to some degree.

Modification Example Through All Embodiments

Though the LED 101 is used as the light source, an EL device, a halogen lamp and so on may be used.

Though the second lens 104 is the parallel flat plate, a curved surface may be included.

Though the LEDs 101 are linearly arranged on the flat-plate LED substrate 103, it is also preferable to arrange LEDs on a flexible substrate to be arranged in a curved line.

Though the light source unit including the LEDs 101, the first lens units 102, the LED substrate 103 and the second lens 104 is arranged inside the XZ plane (horizontal surface arrangement), it is also preferable to arrange the light source unit at an arbitrarily inclined angle by allowing the axis of the cylindrical lenses of the second lens 104 to be parallel to the Y axis (upper and lower direction) and the lens central axis 109 to be set in the front direction (Z-axis direction).

When an anti-reflection film or a minute anti-reflection structure is formed in the first lens unit and the second lens unit other than the total reflection surface 108 of the triangular prism 106, light intensity can be improved approximately 4% per one surface, 16% in four surfaces in total, though the costs are increased.

Though the combination of the cylindrical lens and the planar portion without the cylindrical lens is used for adjusting the broadening of light in the right and left direction (in the XZ plane) in the second lens, it is also preferable to apply, for example, a structure in which the planar portion is formed in an apex portion of the cylindrical lens.

Though the total reflection of the triangular prism 106 in the first lens unit 102 is a flat surface, it is also preferable that the surface is formed to be an aspherical surface with a parabola, an ellipse and the like in cross section and that the second lens 107 is formed as the cylindrical lens 123.

It is also preferable that the light source is shaped by a mask by arranging the mask in on an emitting surface of the second lens 104 to limit the opening, though the light amount is reduced.

Though the first lens 105, the triangular prism 106 and the second lens 107 are integrally formed in the above description, it is also preferable that they are formed as different members and are bonded by a transparent adhesive having approximately the same refractive index.

REFERENCE SIGNS LIST

11 LED array
12 lens
14 light guide plate
15 prism
16 light
100 illumination device
101 LED
102, 201 first lens unit
103 LED substrate
104 second lens
105, 203 first lens
106 triangular prism
107, 204 second lens
108, 210 total reflection surface
109, 110 lens central axis
111 front rays of light
112 triangular prism
113 fourth lens
114 triangular prism
115 fifth lens
116 substrate
117 planar portion
121 triangular prism
122 third lens prism
132 oblique rays of light
123 cylindrical lens
124 cylindrical lens pitch
125 cylindrical lens forming area
133 reflector
142 flat portion
150 motor vehicle
205 prism
206, 207, 211 lens surface

The invention claimed is:

1. An illumination apparatus comprising:
an LED;
a lens unit provided above the LED; and
a cylindrical lens provided above the lens unit,
wherein the lens unit includes:
  a first lens,
  a first prism positioned on the LED's side in a first side surface of the first lens, and
  a second lens positioned so as to be adjacent to the first prism on the cylindrical lens's side in the first side surface of the first lens.

2. The illumination apparatus according to claim 1, wherein plural LEDs and plural lens units are provided in a direction where the first side surface is positioned.

3. The illumination apparatus according to claim 1, wherein plural cylindrical lenses are arranged in a line, and
gaps are formed between plural cylindrical lenses.

4. The illumination apparatus according to claim 3, wherein the whole area of gap regions is 1 to 20% of the area of regions of all cylindrical lenses.

5. The illumination apparatus according to claim 1, wherein emitted light from one lens unit is incident on the plural cylindrical lenses.

6. The illumination apparatus according to claim 1, wherein a cylinder central axis of the plural cylindrical lenses is along a vertical direction.

7. The illumination apparatus according to claim 6, wherein the plural cylindrical lenses are arranged in a line, and a direction of the line and the central axis of the cylindrical lenses are shifted from the vertical direction.

8. The illumination apparatus according to claim 7, wherein an angle of the shift from the vertical direction is 5 degrees or less.

9. The illumination apparatus according to claim 1, further including a plurality of the LEDs arranged in a line, and a plurality of lens unit arranged to correspond to the plurality of LEDs, respectively.

10. The illumination apparatus according to claim 1, wherein the lens unit further includes:

a second prism positioned on the LED's side in a second side surface opposite to the first side surface of the first lens; and a third lens positioned adjacent to the second prism on the cylindrical lens's side in the second side surface of the first lens.

11. The illumination apparatus according to claim 10, wherein a direction connecting the first side surface to the second side surface of the first lens is an arrangement direction of the plural LEDs.

12. The illumination apparatus according to claim 1, wherein the lens unit further includes:

a third prism positioned on the LED's side in a third side surface perpendicular to the first side surface in the first lens; and a fourth lens positioned on the cylindrical lens's side and adjacent to the third prism in the third side surface of the first lens.

13. The illumination apparatus according to claim 12, wherein the lens unit further includes:

a fourth prism positioned on the LED's side in a fourth side surface opposite to the third side surface in the first lens; and a fifth lens adjacent to the fourth prism in the cylindrical lens's side of the fourth side surface.

14. The illumination apparatus according to claim 1, wherein the first lens and the second lens are spherical lenses, and the first prism is a triangular prism.

15. The illumination apparatus according to claim 1, wherein the first lens portion and the second lens portion are aspherical lenses, and the first prism is a prism having an aspherical surface.

16. The illumination apparatus according to claim 1, wherein, when a distance between the lens unit and the cylindrical lens is L, a pitch of the LEDs is P and a half width at half maximum of a broadening angle of light from the lens unit is θ, the following relation holds:

$L > P/(8 \times \tan \theta)$.

17. The illumination apparatus according to claim 1, wherein the cylindrical lens has a columnar shape or a cylindrical shape.

18. A motor vehicle on which the illumination apparatus according to claim 1 is mounted, wherein the illumination apparatus includes at least another lens unit arranged without a gap with the lens unit when seen from a front face of the motor vehicle.

19. A motor vehicle on which the illumination apparatus according to claim 1 is mounted, wherein the illumination apparatus is provided so as to cover the front face to a side face of the motor vehicle.

* * * * *